(12) United States Patent
Rodecker

(10) Patent No.: US 8,066,266 B2
(45) Date of Patent: *Nov. 29, 2011

(54) END PLATED SHEAR-HUB ISOLATOR

(75) Inventor: Troy P. Rodecker, Berlin Heights, OH (US)

(73) Assignee: The Pullman Company, Milan, OH (US)

( * ) Notice: Subject to any disclaimer, the term of this patent is extended or adjusted under 35 U.S.C. 154(b) by 876 days.

This patent is subject to a terminal disclaimer.

(21) Appl. No.: 12/043,498

(22) Filed: Mar. 6, 2008

(65) Prior Publication Data

US 2009/0224447 A1    Sep. 10, 2009

(51) Int. Cl.
*F16F 7/00* (2006.01)

(52) U.S. Cl. .............. 267/141.4; 267/141.1; 267/141.5; 267/294; 267/153; 180/68.4; 180/89.2; 180/296; 180/309; 248/60; 248/610

(58) Field of Classification Search ............. 267/141.1, 267/141.2, 141.4, 141.5, 140.12, 293, 294; 267/153; 248/58, 60, 609, 610, 635; 180/68.4, 180/89.2, 296, 309
See application file for complete search history.

(56) References Cited

U.S. PATENT DOCUMENTS

| | | | | |
|---|---|---|---|---|
| 2,132,840 A * | 10/1938 | Workman et al. | ........... | 267/141.4 |
| 2,538,658 A * | 1/1951 | Saurer | .................. | 267/141.5 |
| 3,957,127 A * | 5/1976 | Bouchard et al. | ........... | 248/599 |
| 4,651,839 A * | 3/1987 | Isobe | ................... | 180/68.4 |
| 5,121,905 A * | 6/1992 | Mann et al. | ............... | 267/141.4 |
| 5,284,315 A | 2/1994 | Hofmann et al. | | |
| 5,655,758 A * | 8/1997 | Hadano et al. | ........... | 267/141.7 |
| 6,435,489 B1 * | 8/2002 | Rice et al. | ................ | 267/140.5 |
| 6,758,300 B2 | 7/2004 | Kromis et al. | | |
| 7,316,389 B2 * | 1/2008 | Rawson | ................. | 267/141.7 |
| 7,644,911 B2 * | 1/2010 | Rodecker | ................ | 267/293 |
| 7,735,812 B2 * | 6/2010 | Fitzgerald | ............... | 267/293 |
| 2007/0063401 A1 | 3/2007 | Rodecker | | |
| 2009/0224448 A1 * | 9/2009 | Rodecker | ................ | 267/141.1 |
| 2009/0224450 A1 * | 9/2009 | Rodecker | ................ | 267/294 |

FOREIGN PATENT DOCUMENTS

| | | |
|---|---|---|
| JP | 2005-120847 | 5/2005 |
| WO | WO 2007-037924 | 4/2007 |

OTHER PUBLICATIONS

Search Report dated Aug. 6, 2009 in corresponding PCT Application No. PCT/US2009/032580.

\* cited by examiner

*Primary Examiner* — Robert Siconolfi
*Assistant Examiner* — Mariano Sy

(57) ABSTRACT

An elastomeric isolator has an elastomeric body which incorporates an inner structural member and an outer structural member. The elastomeric body includes a shear hub extending between radial flanges or end plates of the inner and outer structural members that undergoes shearing stresses during deflection of the elastomeric isolator. The elastomeric body is bonded to the radial flanges or end plates. The inner structural member includes a radial flange which is axially offset from an axial flange of the outer structural member. The outer structural member includes a radial flange which is axially offset from an axial flange of the inner structural member. With this configuration, excessive stresses on the elastomeric body are avoided during high load movements of the elastomeric isolator.

14 Claims, 4 Drawing Sheets

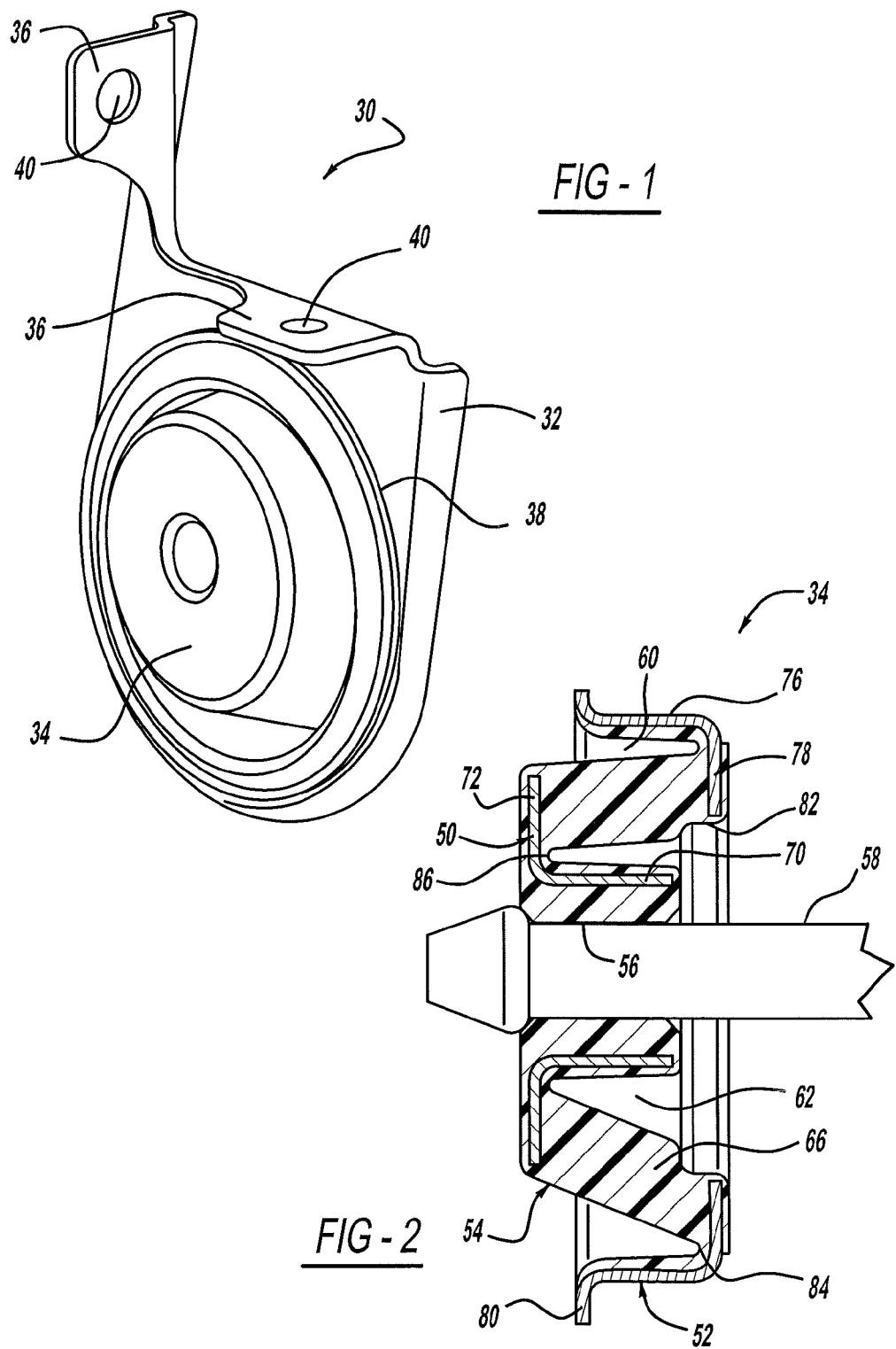

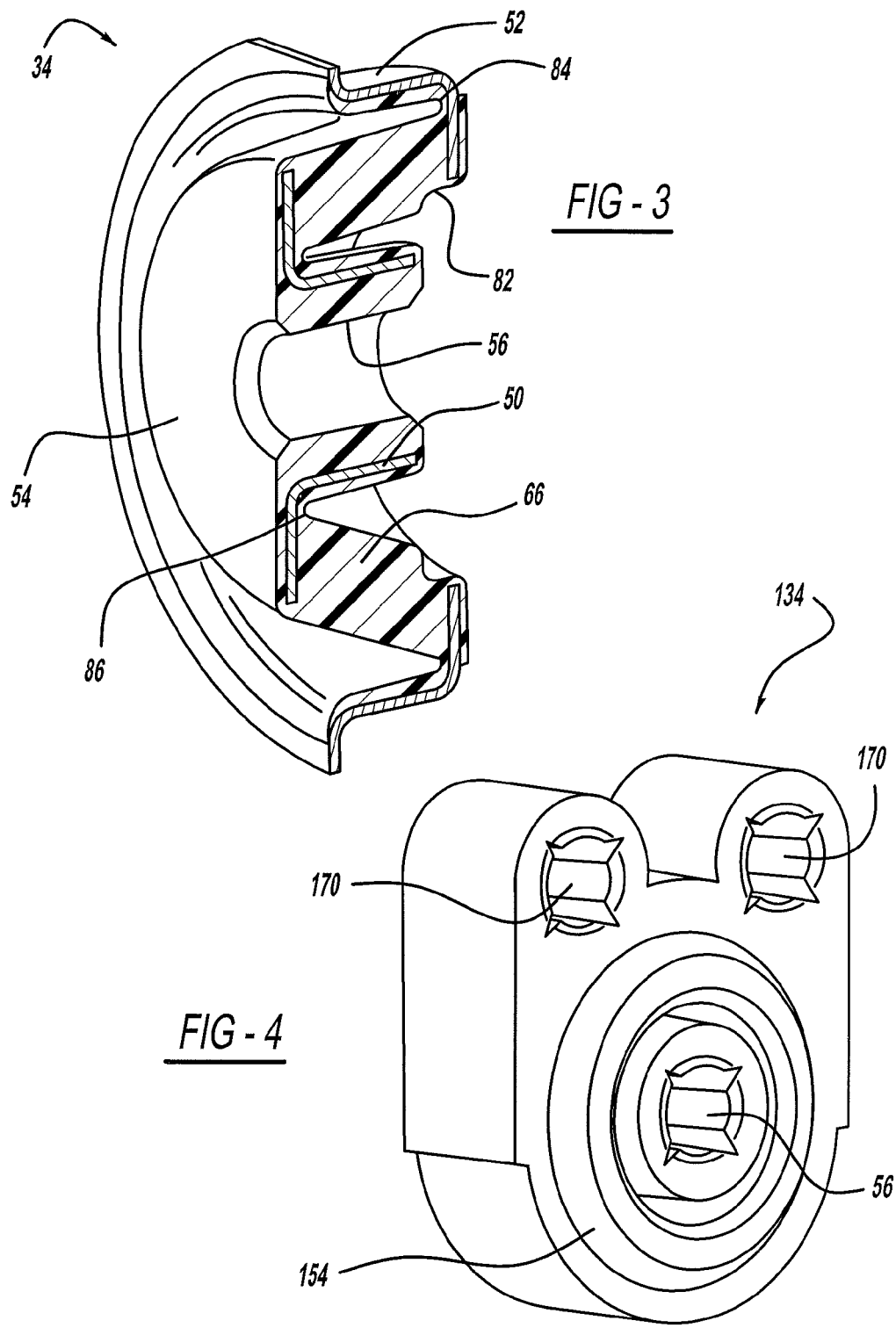

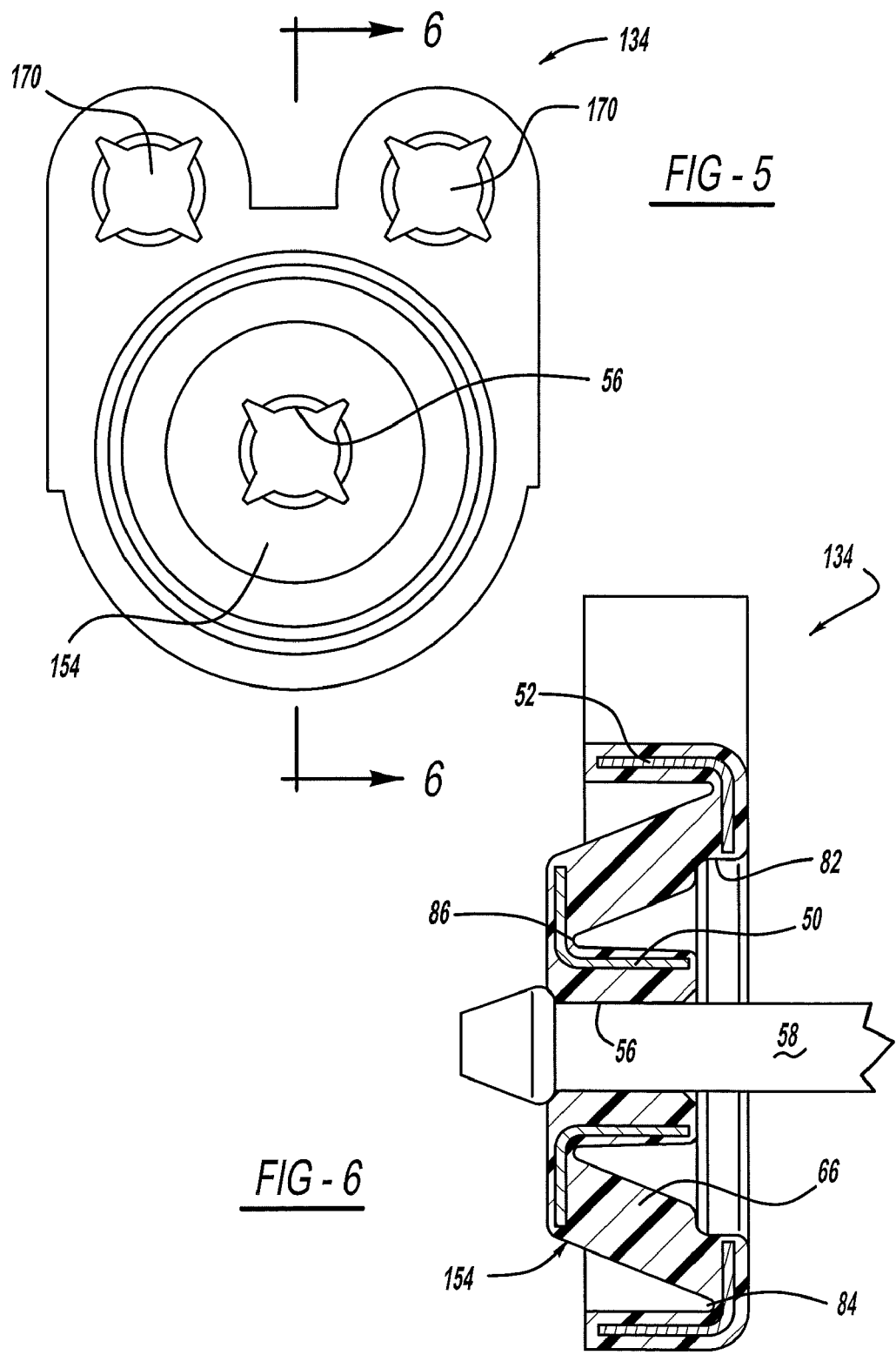

END PLATED SHEAR-HUB ISOLATOR

FIELD

The present disclosure relates to an isolator such as an automotive exhaust system isolator. More particularly, the present disclosure relates to an isolator which is configured to provide a very soft on-center rate, to have the ability to endure spike durability loads and to minimize or eliminate vulnerable stress concentrations.

BACKGROUND

The statements in this section merely provide background information related to the present disclosure and may not constitute prior art.

Typically, automotive vehicles including cars and trucks have an internal combustion engine which is coupled to at least a transmission and a differential for providing power to the drive wheels of the vehicle. An engine exhaust system which typically includes an exhaust pipe, a catalytic converter and a muffler is attached to the engine to quiet the combustion process, to clean the exhaust gases and to route the products of combustion away from the engine to a desired position typically at the rear of the vehicle. The exhaust system is supported by exhaust mounts which are positioned between the exhaust system and the frame or some other supporting structure of the vehicle body. In order to prevent engine vibrations from being transmitted to the car body, the exhaust mounts incorporate flexible members or elastic suspension members to isolate the vehicle's exhaust system from the vehicle's body. In order to effectively isolate the vehicle's exhaust system from the vehicle's body, it is preferred that the isolator include a soft on-center rate of deflection.

The prior art exhaust mounts or isolators have included rubber isolators which are a solid rubber component or a puck that is at least three-quarters of an inch thick and which is provided with at least one pair of apertures extending therethrough. The apertures each receive an elongated metal stud. The metal stuff is provided with an enlarged tapered head that can be forced through the aperture in the isolator, but it cannot be readily removed from the isolator. The opposite end of the stud is welded to or otherwise secured to either a support point in the vehicle or to one of the components of the exhaust system.

Other designs for isolators include elastomeric moldings of a spoke design where spokes are loaded in tension and compression and a shear leg design that include a leg that is subjected to shearing in the primary loading direction. Most elastomers which are utilized for exhaust isolators exhibit poor tensile fatigue properties stemming from low tear strength properties. The preferred method to load the elastomeric material is in compression or shear.

The prior art puck design is the simplest design, and as discussed above, two pins are inserted at opposite ends of the elastomer and the loads inflict pure tension on the elastomer cords connecting both ends. While this is typically the lowest cost design, it is also the most abusive to the material. In order to offset the failure risk, flexible and/or rigid bands are typically designed inside or around the outside of the elastomeric puck. The advantage of this design is its ability to swivel about one hanger hole to accommodate large positional tolerances for the hanger.

The prior art spoke design isolators load the elastomeric material in compression and tension. The tensile loading makes the design vulnerable to fractures in overloaded conditions. The stress magnitude is directly proportional to the load divided by the minimum spoke cross-sectional area. An additional requirement of the spoke design is that the mating component or hanger pin be centered within the deflection zone while statically preloaded by the weight of the exhaust. If it is not, the voids designed into the isolator will be bottomed out or positioned in a groundout condition. This results in the soft on-center rate not being employed, thus defeating the purpose of the isolator.

The prior art shear leg design has a primary loading direction which is typically vertical and a secondary loading direction which is typically lateral. When the shear leg design is loaded in its primary loading direction, the loading method is the preferred shear style loading. In addition, this shear style loading is able to be designed desirably soft. However, the secondary loading direction inflicts tensile compressive stresses which are unfavorable for durability. In addition, the secondary loading direction has a rate that is two to three times stiffer than the primary rate which is also an unfavorable condition.

The continued development of elastomeric mounts has been directed to elastomeric mounts which include a soft on-center rate while avoiding the undesirable tension loading of the elastomeric bushing and which avoid the vulnerable stress concentrations. While this has been achieved in the prior art shear-hub designs, stress concentrations at the ends of the voids continues to be a problem.

SUMMARY

The present disclosure provides the art with an elastomeric bushing which uses radial loading which avoids the tension stress loading of the bushing. The radial loading causes shear stresses of the elastomeric bushing regardless of the direction of the loading. Tuning for rate and deflection in specific directions can be independent from other directions by altering voids in the elastomeric bushings. The elastomeric bushing incorporates structural members which avoid the vulnerable stress concentrations.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a perspective view of an elastomeric isolator assembled to a bracket in accordance with the present disclosure;

FIG. 2 is a cross-sectional view of the elastomeric isolator illustrated in FIG. 1;

FIG. 3 is a perspective view partially in cross-section illustrating the end plates of the elastomeric isolator illustrated in FIGS. 1 and 2;

FIG. 4 is a perspective view of an elastomeric isolator in accordance with another embodiment of the present disclosure;

FIG. 5 is an end view of the elastomeric isolator illustrated in FIG. 4;

FIG. 6 is a cross-sectional view of the elastomeric isolator illustrated in FIG. 4.

DESCRIPTION

Figure 7:
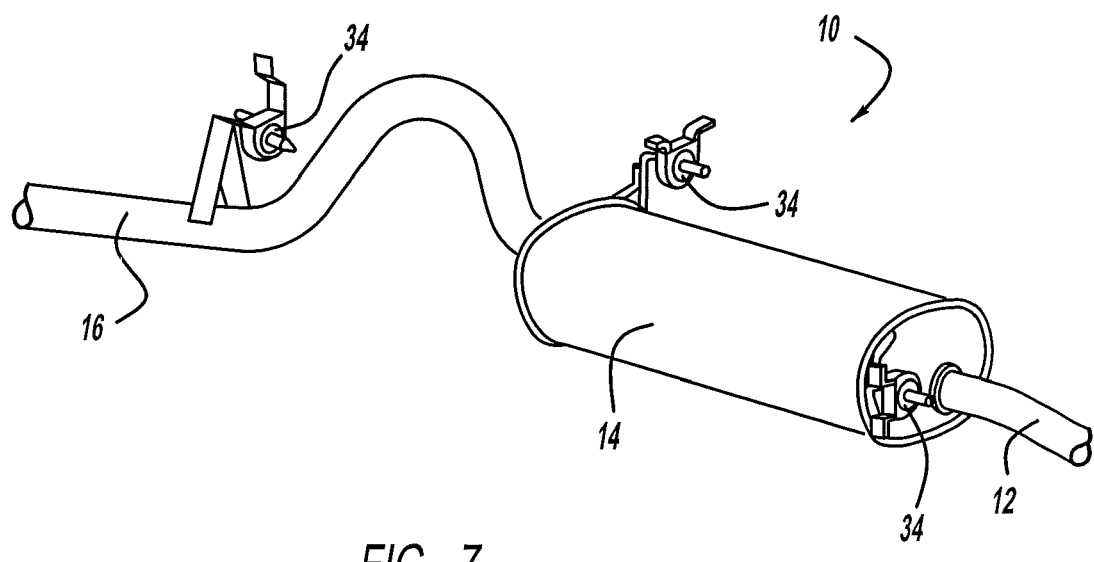
FIG. 7 is a perspective view of an exhaust system which incorporates the unique exhaust isolators in accordance with the present disclosure.

The following description is merely exemplary in nature and is not intended to limit the present disclosure, application, or uses.

Referring now to the drawings, there is shown in FIG. 7 an exhaust system which includes the exhaust system isolators in accordance with the present disclosure and which are designated generally by the reference numeral 10. A typical vehicle comprises an internal combustion engine (not shown), a body (not shown), a suspension system (not shown) and exhaust system 10 which is attached to the internal combustion engine and which is supported typically beneath the vehicle. The internal combustion engine is designed to power one or more drive wheels of the vehicle and the exhaust system routes the products of combustion to a desired exhaust location around the outside of the vehicle.

Exhaust system 10 comprises an intermediate pipe 12, a muffler 14, a tailpipe 16 and a plurality of isolator assemblies of various designs. Intermediate pipe 12 is typically connected to the engine or to a catalytic converted (not shown) which is then attached to an exhaust pipe which extends between the engine and the catalytic converter. The catalytic converted may be attached to a single exhaust pipe which leads to a single exhaust manifold or the catalytic converter can be attached to a branched exhaust pipe which leads to a plurality of exhaust pipes which lead to a plurality of exhaust manifolds. Also, intermediate pipe 12 can be attached to a plurality of catalytic converters which connect together prior to reaching muffler 14 using intermediate pipe 12 or the vehicle can have a plurality of exhaust pipes, a plurality of catalytic converters, a plurality of intermediate pipes 12 and a plurality of mufflers 14 which connect together using a single or multiple tailpipes 16. In addition, the exhaust system isolator of the present disclosure is applicable to any type of exhaust system including but not limited to dual exhaust systems which have two separate parallel exhaust systems extending from the internal combustion system.

Exhaust system 10 is utilized to route the exhaust gases from the engine to a desired location around the outside of the vehicle. While traveling through the exhaust system, the catalytic converter cleans the exhaust gases and muffler 14 quiets the noise created during the combustion process in the engine. The present disclosure is directed toward the exhaust system isolators which mount exhaust system 10 to the vehicle while at the same time, isolate the movement of exhaust system 10 with respect to the vehicle.

Referring now to FIGS. 1-3, an exhaust system isolator assembly 30 comprises a bracket 32 and an exhaust system isolator 34. Bracket 32 is a metal or plastic component which defines a pair of mounting flanges 36 and an isolator aperture 38. Each of the pair of mounting flanges 36 defines a mounting bore 40 which accepts a fastener for securing exhaust system isolator assembly 30 to a vehicle frame or another structural component of the vehicle. While FIG. 1 illustrates flanges 36 being generally perpendicular to each other, it is within the scope of the present disclosure to arrange flanges 36 in any orientation which is required to have bracket 32 properly interface with the mounting structure of the vehicle.

Exhaust system isolator 34 comprises an inner structural member 50, an outer structural member 52 and an elastomeric body 54 disposed between structural members 50 and 52.

Elastomeric body 54 defines a bore 56 which is designed to accept an inner tube, a bolt, or a hanger pin 58. Hanger pin 58 is attached to a component of exhaust system 10. While bracket 32 is disclosed as being attached to a structural component of the vehicle and exhaust system isolator 34 is disclosed as being attached to a component of exhaust system 10, using hanger pin 58, it is within the scope of the present disclosure to have bracket 32 attached to exhaust system 10 and exhaust system isolator 34 attached to a structural component of the vehicle using hanger pin 58. Thus, exhaust system 10 is secured to the vehicle through one or more exhaust system isolator assemblies 30.

Elastomeric body 54 defines an outer circumferential void 60 and an inner circumferential void 62. While voids 60 and 62 are illustrated as being asymmetrical with respect to bore 56, it is within the scope of the present disclosure to have voids 60 and 62 symmetrical with bore 56. The asymmetrical design for voids 60 and 62 permit bore 56 to become disposed at or near the centerline of outer structural member 52 during the assembled or statically loaded condition of exhaust system isolator assembly 30.

As can be seen in the figures, void 60 overlaps with void 62 in the axial direction to define a shear hub 66 which undergoes the shear loading due to the deflection of elastomeric body 54. During larger loading of exhaust system isolator assembly 30, voids 60 and 62 close and compressive stresses are imparted to elastomeric body 54 by the sandwiching of elastomeric body 54 between hanger pin 58 and inner structural member 50 and between inner structural member 50 and outer structural member 52.

The design of voids 60 and 62, specifically their thickness, will determine the amount of travel of bore 56 with respect to outer structural member 52 until the load to radially deflect exhaust system isolator assembly 30 spikes up due to the closing of voids 60 and 62. Until the closing of voids 60 and 62, the radial movements of bore 56 cause pure shear in elastomeric body 54 regardless of the loading direction. This shear loading occurs in the portion of elastomeric body 54 disposed between outer structural member 52 and inner structural member 50 as discussed below. Tuning for rate and deflection in selected directions can be accomplished independently from other directions by altering voids 60 and 62 in the selected direction or by adding voids at specific circumferential positions of elastomeric body 54.

Exhaust system isolator 34 avoids tension stress loading in elastomeric body 54 during radial loading. The shear style loading in all directions enables exhaust system isolator 34 to achieve a lower and more stable rate of deflection. This is because the shear modulus (shear loading) is lower than the elasticity modulus (tensile loading). Also, the spring rate of elastomeric materials in shear is more consistent than in tensile. The rates and deflections are capable of being symmetrical about the center axis or they can be tuned using voids 60 and 62 or by otherwise altering the size or shape of elastomeric body 54 or the rigid structures. An additional advantage is that the rate of deflection for shear hub 66 is linear throughout the deflection (until voids 60 and/or 62 close) which adds robustness to the design in regards to the position. This means that any pre-load from positional tolerances will not spike the rates of deflection and make the Noise, Vibration and Harshness (NVH) of the vehicle change with the exhaust geometry tolerances.

Inner structural member 50 is an outward flanged tube made of metal or plastic component which includes an axial cylinder 70 and a radial flange 72. Axial cylinder 70 extends over bore 56 and radial flange 72 extends radially outward from axial cylinder 70 to provide a base for shear hub 66 at one end of shear hub 66. Elastomeric body 54 is bonded to inner structural member 50 including shear hub 66 being bonded to radial flange 72.

Outer structural member 52 is an inward flanged tube made of metal or plastic component which includes an axial cylinder 76 and a radial flange 78. Axial cylinder 76 extends over elastomeric body 54 and is designed to be press-fit or otherwise assembled into isolator aperture 38. A radially outwardly extending flange 80 assists in the assembly of exhaust system isolator 34 to bracket 32 as well as providing hoop strength for axial cylinder 76. Radial flange 78 extends radially inward from axial cylinder 76 to provide a base for shear hub 66 at the opposite end of shear hub 66. Elastomeric body 54 is bonded to outer structural member 52 including shear hub 66 being bonded to radial flange 78.

Referring now to FIG. 2, it can be seen that the axial left end of inner structural member 50 extends further out or to the left from the axial end of outer structural member 52 such that the entire axial cylinder 76 of outer structural member 52 is axially spaced from radial flange 72 of inner structural member 50. Thus, at the left side in FIG. 2, outer structural member 52 is axially short of inner structural member 50 and this permits shear hub 66 to act as a cushion during high loads without affecting or causing shear stress in the bond between radial flange 72 of inner structural member 50 and elastomeric body 54. In a similar manner, it can be seen that the axial right end of outer structural member 52 extends further out or to the right from the axial end of inner structural member 50 such that the entire axial cylinder 70 of inner structural member 50 is axially spaced from radial flange 78 of outer structural member 52. Thus, at the right side in FIG. 2, inner structural member 50 is axially short of outer structural member 52 and this permits shear hub 66 to act as a cushion during high loads without affecting or causing shear stress in the bond between radial flange 78 of outer structural member 52 and elastomeric body 54. Also, as illustrated in FIG. 2, elastomeric body 54 defines a relieved portion 82 disposed adjacent the inner end of radial flange 78 of outer structural member 52 to lower the stress on the bonding section between radial flange 78 and elastomeric body 54 during high loading where voids 60 and 62 are closed.

In addition, the location of shear hub 66 between radial flange 72 and radial flange 78 and the bonding of shear hub 66 and elastomeric body 54 to radial flange 72 and radial flange 78 eliminates the transmission of stress through void toe radiuses 84 and 86 of voids 60 and 62, respectively, thus avoiding stress concentration seen in conventional shear-hub designs.

Referring now to FIGS. 4-6, an exhaust system isolator 134 in accordance with another embodiment of the present disclosure is disclosed. Exhaust system isolator 134 comprises inner structural member 50, outer structural member 52 and an elastomeric body 154. Exhaust system isolator 134 is the same as exhaust system isolator 34 except that elastomeric body 154 replaces elastomeric body 54.

Elastomeric body 154 is the same as elastomeric body 54 except that elastomeric body 154 extends radially outward from outer structural member 52 to define a pair of mounting bores 170. Mounting bores 170 are each designed to accept a hanger pin 58 such that the pair of hanger pins 58 mating with mounting bores 170 are attached to the structural member of the vehicle and hanger pin 58 mating with bore 56 is attached to a component of exhaust system 10. Also, it is within the scope of the present disclosure to have the pair of hanger pins 58 mated with mounting bores 170 attached to the component of exhaust system 10 and the hanger pin 58 mating with bore 56 attached to the structural portion of the vehicle if desired.

The mounting system for exhaust system isolator 34 and 134 is not limited to using bracket 32 or mounting bores 170. Any of the mounting systems disclosed in Applicant's copending application Ser. No. 11/233,283, the disclosure of which is incorporated herein by reference, could be utilized to mount exhaust system isolator 34 to the vehicle.

The overall size of exhaust system isolator can be tuned to accommodate a required packaging size dictated by a vehicle's design. Factors which need to be considered when tuning an exhaust gas isolator include the requirement that the voids overlap enough in the axial direction to avoid any tension of the elastomeric body at max travel; the widths of the voids must be large enough to allow Noise, Vibration and Harshness (NVH) travel before bottoming out and spiking rates; the thickness of the shear hub should be large enough to provide the desired or center rate; and the inner and outer structural members and bracket length are large enough to provide compressive stresses manageable under peak durability loads.

What is claimed is:

1. An isolator comprising:
an elastomeric body;
an outer structural member attached to said elastomeric body, said outer structural member having an axially extending cylinder having a first terminal end and a second end and a radially extending flange extending radially inwardly from said second end of said axially extending cylinder of said outer structural member; and
an inner structural member disposed radially inward from said outer structural member and attached to said elastomeric body, said inner structural member having an axially extending cylinder having a first end and a second terminal end and a radially extending flange extending radially outward from said first end of said axially extending cylinder of said inner structural member; wherein
said axially extending cylinder of said inner structural member between said first and second terminal ends is axially offset from said radially extending flange of said outer structural member; and
said outer structural member is positioned with respect to said inner structural member such that said first terminal end of said axially extending cylinder of said outer structural member is located axially between said first end and said second terminal end of said axially extending cylinder of said inner structural member and said second terminal end of said axially extending cylinder of said inner structural member is located axially between said first terminal end and said second end of said axially extending cylinder of said outer structural member.

2. The isolator according to claim 1, wherein said elastomeric body defines a shear hub extending between said outer structural member and said inner structural member.

3. The isolator according to claim 1, wherein said radially extending flange of said inner structural member is axially opposed to said radially extending flange of said outer structural member.

4. The isolator according to claim 3, wherein said elastomeric body defines a shear hub extending between said radially extending flanges of said inner and outer structural members.

5. The isolator according to claim 4, wherein said shear hub is bonded to said radially extending flanges of said inner and outer structural members.

6. The isolator according to claim 1, wherein said elastomeric body defines a first circumferential void and a second circumferential void surrounding said first circumferential void, a shear hub being defined by said first and second circumferential voids.

7. The isolator according to claim 1, wherein said elastomeric body defines a mounting bore extending through said elastomeric body, said axial cylinder of said inner structural member extending over said mounting bore.

8. The isolator according to claim 1, wherein said axially extending cylinder of said outer structural member between said first and second terminal ends is axially offset from said radially extending flange of said inner structural member.

9. The isolator according to claim 8, wherein said elastomeric body defines a shear hub extending between said outer structural member and said inner structural member.

10. The isolator according to claim 8, wherein said radially extending flange of said inner structural member is axially opposed to said radially extending flange of said outer structural member.

11. The isolator according to claim 10, wherein said elastomeric body defines a shear hub extending between said radially extending flanges of said inner and outer structural members.

12. The isolator according to claim 11, wherein said shear hub is bonded to said radially extending flanges of said inner and outer structural members.

13. The isolator according to claim 8, wherein said elastomeric body defines a first circumferential void and a second circumferential void surrounding said first circumferential void, a shear hub being defined by said first and second circumferential voids.

14. The isolator according to claim 8, wherein said elastomeric body defines a mounting bore extending through said elastomeric body, said axial cylinder of said inner structural member extending over said mounting bore.

* * * * *